(12) United States Patent
Miska

(10) Patent No.: US 6,402,119 B1
(45) Date of Patent: Jun. 11, 2002

(54) TEXTILE-REINFORCED RUBBER EXHAUST SYSTEM HANGER

(75) Inventor: Stanley R. Miska, Pittsford, NY (US)

(73) Assignee: Schlegel Systems, Inc., Rochester, NY (US)

( * ) Notice: Subject to any disclaimer, the term of this patent is extended or adjusted under 35 U.S.C. 154(b) by 0 days.

(21) Appl. No.: 09/697,525

(22) Filed: Oct. 26, 2000

(51) Int. Cl.[7] ............................................. F16M 13/00
(52) U.S. Cl. .......................... 248/613; 248/58; 248/610; 248/634
(58) Field of Search ................................ 248/613, 610, 248/612, 560, 634, 635, 58

(56) References Cited

U.S. PATENT DOCUMENTS

| | | | | |
|---|---|---|---|---|
| 3,960,232 A | | 6/1976 | Hubbell, III | |
| 4,116,411 A | * | 9/1978 | Masuda | 248/60 |
| 4,361,304 A | | 11/1982 | Younger | |
| 4,415,391 A | * | 11/1983 | Reid | 156/187 |
| 4,727,957 A | * | 3/1988 | Fujita | 181/208 |
| 4,817,909 A | * | 4/1989 | Deane | 248/610 |
| 4,893,778 A | * | 1/1990 | Drabing et al. | 248/610 |
| 5,032,342 A | * | 7/1991 | Drabing et al. | 264/263 |
| 5,050,837 A | * | 9/1991 | Hamada et al. | 248/610 |
| 5,082,252 A | * | 1/1992 | Miyamoto | 267/140.1 |
| 5,398,907 A | * | 3/1995 | Kelchner | 248/634 |
| 5,416,961 A | | 5/1995 | Vinay | |
| 5,507,463 A | * | 4/1996 | Kobylinski et al. | 248/610 |
| 5,575,461 A | * | 11/1996 | Ihle | 267/153 |
| 5,673,877 A | * | 10/1997 | Karner et al. | 248/58 |
| 5,712,449 A | | 1/1998 | Miska et al. | |
| 5,829,732 A | * | 11/1998 | Yamaguchi et al. | 248/610 |
| 5,951,021 A | | 9/1999 | Ueta | |
| 6,264,164 B1 | * | 7/2001 | Steinmaier | 249/610 |

* cited by examiner

Primary Examiner—Anita King
(74) Attorney, Agent, or Firm—Stephen B. Salai, Esq.; Brian B. Shaw, Esq.; Harter, Secret & Emery LLP

(57) ABSTRACT

A molded rubber hanger with a reinforcing belt made from a woven fabric or a continuous yarn. The belt has perforations through which the rubber passes to form a mechanical bond. The perforations may be woven directly into a fabric, or they may be provided after fabrication of the belt.

14 Claims, 2 Drawing Sheets

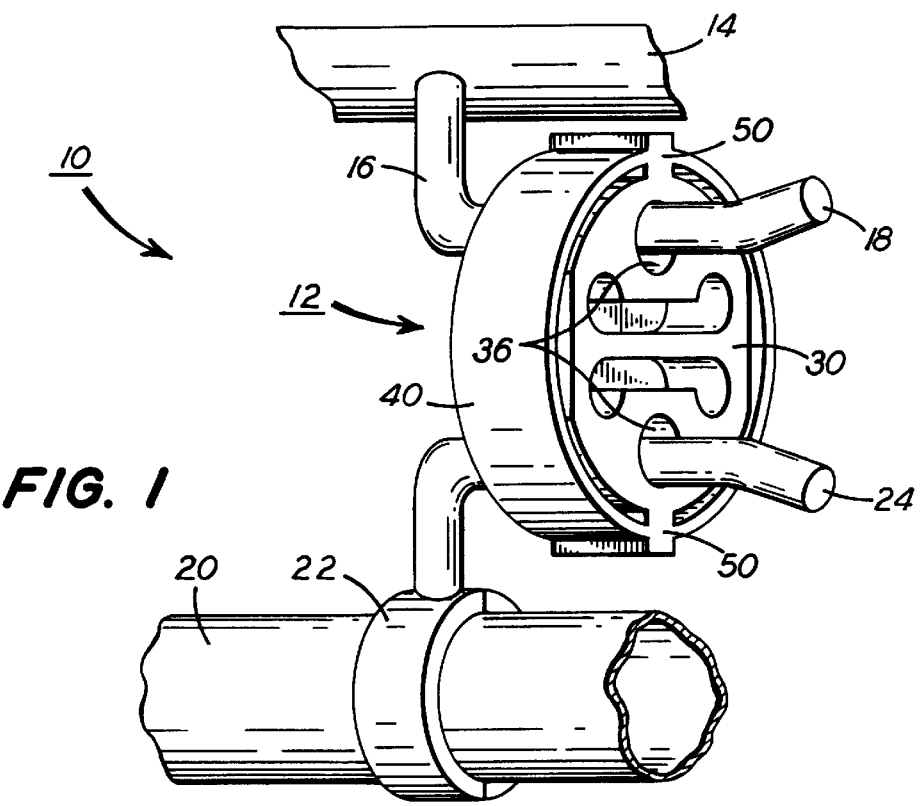
FIG. 1
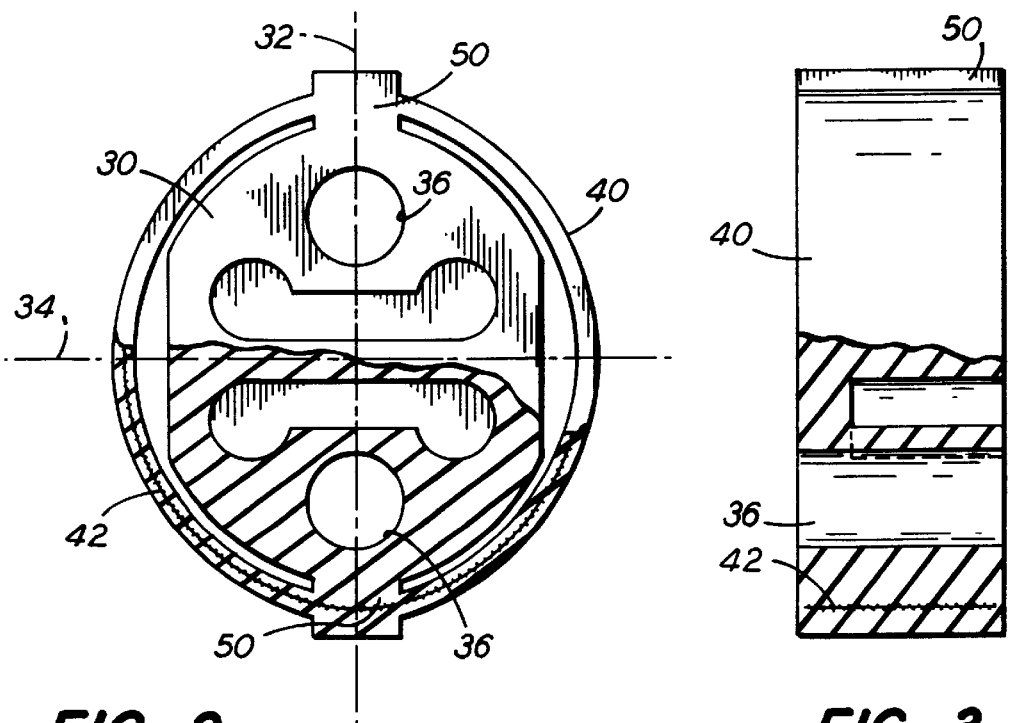
FIG. 2
FIG. 3

TEXTILE-REINFORCED RUBBER EXHAUST SYSTEM HANGER

FIELD OF THE INVENTION

This invention relates to reinforcement hangers for automobile exhaust systems. More specifically, it relates to a woven fabric reinforcement that provides added support to such hangers at a relatively low cost.

BACKGROUND OF THE INVENTION

It is a known practice in the suspension of automotive exhaust systems to support the exhaust pipe and/or tailpipe (exhaust conduits) at various points along the system length to fixed parts of a vehicle frame or chassis. Such support includes a pipe holding means. Conventional supporting hangers include, for example, a metal bracket attached to the underbody frame of the vehicle, a second bracket attached to the tailpipe, and a piece of flexible or resilient material connected between the ends of the brackets. In the conventional design, the resilient material is placed under tension by the weight of the exhaust system suspended therefrom.

A common difficulty with conventional hangers is that the resilient element tends to fatigue or otherwise to become progressively weak to the point where the resilient element fails, allowing the exhaust system components to fall down and create a dangerous situation, which is also costly to repair.

An additional problem with conventional hangers is that the arrangement cannot adequately compensate for conditions encountered under service conditions. Exhaust systems tend to elongate when they become hot and the exhaust system may be subjected to considerable shocks and other forces. There is no provision in conventional systems to accommodate sufficiency for axial thermal expansion and contraction of the metal pipe, and the resilient member does not adequately restrain lateral movements.

Currently, molded rubber hangers use welded steel bands or continuous spiral wrapped yarn bands to reinforce the hanger so as to increase the usable lifetime of the hanger. However, problems exist with these materials. Metal bands fail early due to metal fatigue from cyclic loading. Hangers reinforced with wrapped yarn reinforcement are sturdier and perform better. However, it is costly and complex to manufacture hangers wrapped in yarn.

SUMMARY OF THE INVENTION

It is the primary purpose of this invention to provide an improved mounting or support system for exhaust systems used in automobiles that is more durable than prior art systems and is also relatively inexpensive to manufacture.

This object is accomplished by a molded rubber hanger having a fibrous reinforcing belt with a structure that provides enhanced bonding between the reinforcement and the predominant material of the hanger. The reinforcing material of the belt can be a continuously wound thread, or a fabric.

Typically, the predominant material of the hanger is rubber, and the reinforcing material of the belt is derived from polyester or nylon fiber. In the formation of the hanger, the belt is placed in a mold, into which molten rubber is then injected. Perforations are present at intervals around the belt; when molten rubber is injected into the mold, it can flow through the perforations to provide a secure mechanical bond between the belt and the rubber of the finished article.

The fabric consists of warp and weft threads. When the fabric is stressed, only the warp threads bear a significant load, and a minimal number of weft threads is required to hold the warp yarns in alignment. The weft threads also prevent individual warp threads from cutting through the rubber. The strength of the woven product is a result of the warp yarns. The warp threads may be positioned to allow for the perforations, down the center or the sides of the fabric. If a dense fabric is woven without a perforation, holes may be cut, punched, or melted through the center or elsewhere, at various intervals. The mechanical bonds at the perforations allow a multiwrap reinforcement to reach the maximum tensile strength of the yarn by preventing the wraps of fabric from slipping past each other.

BRIEF DESCRIPTION OF THE DRAWINGS

FIG. 1 is a schematic perspective view of a suspension for an automotive exhaust system employing a hanger of the present invention.

FIG. 2 is a plan view of the hanger partially shown in cross-section.

FIG. 3 is a side view of the hanger partially shown in cross-section.

DETAILED DESCRIPTION OF THE PREFERRED EMBODIMENT

Figure 4:
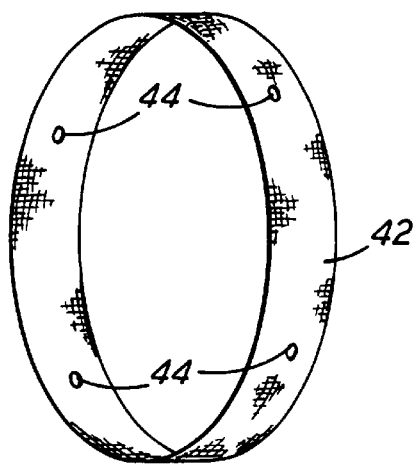
FIG. 4 is a perspective view of a reinforcing belt for the hanger.

A motor vehicle internal combustion engine has an exhaust manifold that discharges exhaust gases into an exhaust system which is connected at its inlet end to the outlet of the manifold, and has an outlet for discharging the gases into the atmosphere. The system includes an exhaust pipe, a muffler and a tailpipe. The front part of the exhaust line or system is supported by means of an attachment pad that is bolted to the manifold outlet flange to hold the inlet of the exhaust pipe in position. Mounting or support means, however, are needed to support various points of the exhaust line downstream from the mounting pad. This mounting means is preferably arranged to permit some vibration or relative movement of the exhaust line with respect to the chassis or frame of the vehicle.

Referring now to the drawings, FIG. 1 shows a suspension 10 for a motor vehicle exhaust system. The suspension 10 includes a reinforced hanger 12 with an inner core 30 and an outer band 40. The hanger is shown more particularly in FIGS. 2 and 3. Its specific dimensions are variable and determined by the particular automobile in which the hanger is used.

As viewed in FIG. 2, the core 30 has the shape of a flattened oval; this can be considered as a circle which has been elongated so that a major diameter 32 has been extended and a minor diameter 34 is unchanged relative to the original diameter. The outer band 40 has a roughly elliptical shape. To form the hanger 12, a molten substance, most commonly rubber, is injected into a mold, from which the hanger is extracted once the rubber has solidified. The mold is designed so that the resulting product has rubber webs 50 that contiguously attach the core 30 and the outer band 40. Typically, there are two such webs, at opposite ends of the major diameter 32. The core 30 has two mounting holes 36 symmetrically placed along the major diameter 32.

Figure 5:
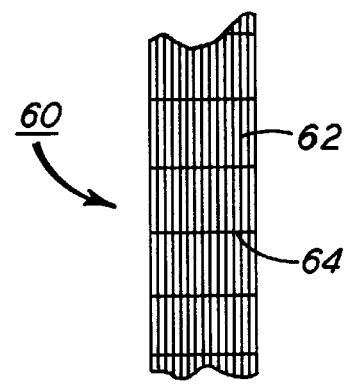
FIG. 5 is a fabric from which the belt can be made.

The outer band 40 contains a reinforcing belt 42 composed of a fibrous reinforcing material. The belt 42 is placed in a position of the mold corresponding to the intended outer band 40, and is encapsulated when molten rubber is injected therein. The belt 42 has perforations 44 at intervals around its circumference, as shown in FIG. 4. The perforations 44 are either woven into the belt 42, or introduced later by cutting, punching or melting, allowing the molten rubber to flow through the belt 42 during the molding process, thus providing for a mechanical bond between the belt 42 and the rubber of the outer band 40. The belt 42 can be composed of a woven fabric 60 with a warp 62 and a weft 64, as shown in FIG. 5. The weft 64 is not load-bearing however, serving only to hold the fabric 60 together. Therefore the belt 42 can also be constructed from non-woven fibrous material. The belt 42 can vary in size according to the required dimensions of the hanger. An exemplary belt could be 3" in diameter and 0.75" wide.

The hanger 12 is used as follows to attach the exhaust system to the vehicle. FIG. 1 shows a part of a vehicle chassis or frame 14. A plurality of brackets 16 on the chassis or frame 14 provide mounting points for an exhaust pipe 20 or other part of the exhaust system. Each bracket 16 has a bracket pin 18 that protrudes in a direction generally parallel to the direction of the proximate part of the exhaust system. The exhaust pipe 20 has a plurality of clamps 22 attached thereto at points corresponding to the brackets 16. Each clamp 22 has a clamp pin 24 that protrudes in the same direction as the pin 18 of its corresponding bracket 16.

In use, it is contemplated that the brackets 16 will be attached to the frame at the desired positions as determined by the design structure of the automobile or other vehicle or installation. The hanger 12 depends from the corresponding bracket pin 18, which passes through one of the holes 36. The corresponding clamp pin 24 passes through the other hole 36. Various fastening means can be used to secure the hanger 12 to the bracket pin 18 and the clamp pin 24. The bracket pin 18 can be upwardly hooked and the clamp pin 24 downwardly hooked to preclude slippage of the hanger 12 from the pins. Alternatively, a fastener can be used to secure the hanger 12 to each of the pins 18 and 24. The fastener can be a nut or a bolt, which can be accepted by a corresponding thread on the pin 18 or 24.

It is evident from FIG. 1 that the hanger 12 in general and the outer band 40 in particular are aligned in a generally vertical plane. The fibrous reinforcement is correspondingly aligned within the band 40 to support a vertical load such as the weight of the exhaust system.

In assembly, the preassembled complete exhaust system may be placed adjacent the frame and the worker has the choice of locating it on the mountings as a first stage, or of bolting the exhaust pipe to the exhaust manifold as the first stage. Preferably, the hangers 12 are mounted on the bracket pins 18, then the exhaust system including the exhaust pipe 20 is put in place by inserting the clamp pins 24 into the holes 36 of the hangers 12; finally, the front of the exhaust system is bolted to the exhaust manifold.

When the hanger is in use, the majority of the load of the exhaust system is exerted on the core 30. However, with severe vibration of the exhaust system, the core 30 will occasionally stretch to the point that more of the load acts on the outer band 40. As the hanger weakens with age, the load is increasingly be borne by the outer band 40. The belt 42 reinforces the outer band 40 and prolongs the lifetime of the hanger. Furthermore, since the belt 42 would not fail at more than one point at a time, its failure would not be catastrophic. Increasing vibrational noise would probably alert the before complete failure.

When fabric reinforcement is used, only the warp threads, which are disposed circumferentially, are exposed to stress. There is no stress on the weft threads, i.e., those across the width of the band 40. The weft threads serve to hold the warp threads in alignment and also to prevent individual warp threads from cutting through the rubber. A minimal amount of weft threads are required to hold the warp threads in alignment. The strength of the fabric 60 is a result of the warp threads.

The threads of the fabric 60 or continuously wound material can be of a variety of yarns. A typical fabric 60 could have polyester or nylon 2-ply threads. Considerable variation is possible in the thread weight and thread count. An exemplary fabric band has 1000 denier warp and weft threads, with a thread count of 48 threads per inch (TPI) for the warp, and of 1 to 20 TPI for the weft. The functioning of the hanger would be relatively unaffected if the threads were 500 denier with a warp thread count of 96 TPI.

Figure 6:
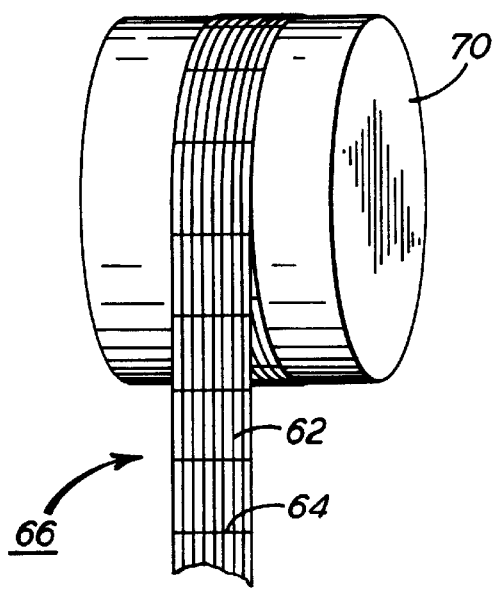
FIG. 6 shows a ribbon of fabric being wound around a mandrel for fabricating the belt.

In one embodiment of the invention, illustrated in FIG. 6, the fabric 60 has the form of a woven ribbon 66 having the same width as the desired width of the belt 42. As illustrated in FIG. 5, the ribbon 66 is wound around a mandrel 70, with the application of an adhesive coating compound until it overlaps itself, usually providing a thickness at all points of at least two, and possibly up to four, layers of material. The mandrel 70 is provided with a thin release layer of a sheet material such as vinyl.

The adhesive coating compound can be any of a wide variety of commercially available solvent- or water-based adhesives, preferably compatible with the rubber compound to enhance adhesion between the belt 42 and the rubber.

The mandrel diameter defines the diameter of the belt 42. When sufficient ribbon 66 has been wound, unwound ribbon is severed from the wound portion. The release layer facilitates removal of the belt 42 from the mandrel 70 once the adhesive is cured. Preferably, a rapid-curing adhesive is selected, so that the belt can be removed immediately after winding. The perforations 44 can be prewoven into the ribbon 66, or they can be cut, drilled, punched, melted or otherwise provided in the formed belt 42. In the case of prewoven perforations 44, care would be needed to ensure that they lined up in successive layers of ribbon 66.

Figure 7:
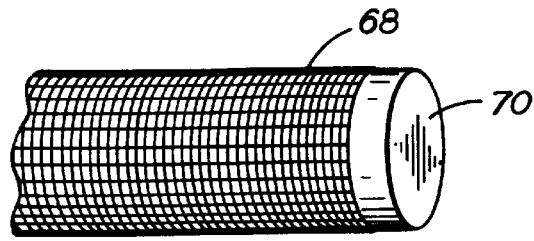
FIG. 7 shows a belt precursor on the mandrel.

In another embodiment, a width of pre-woven fabric 60 greater than the intended width of the band 40 is wound around the mandrel 70. In this case, the mandrel 70 is elongated to accommodate the fabric width. For example, an 80" wide fabric can be wound around a mandrel 84" long. In a process generally similar to the process for forming the single belt 42 from the ribbon 66, a cylindrical precursor 68 is produced. FIG. 7 shows a part of the precursor 68 prior to its removal from the mandrel 70. Once the adhesive has cured, the precursor 68 is cut into a plurality of sections to providing belts 42 of the required dimensions. The belts 42 are removed from the mandrel. If perforations 44 were not prewoven into the fabric 60, they are provided after the formation of the belts 42.

Figure 8:
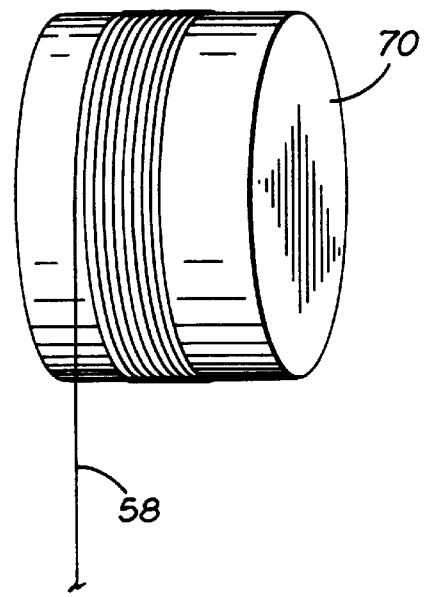
FIG. 8 shows a continuous thread being wound around the mandrel for fabricating the belt.

In another embodiment, the belts 42 are formed without weft threads. As generally illustrated in FIG. 8, a continuous thread 58 is tightly wound i.e., so that adjacent turns contact each other, around a mandrel with a release layer. Various options exist in this embodiment.

In a first option, winding proceeds, with the application of adhesive coating compound, until there are enough turns to provide the belt width. The unwound thread is severed and the coating compound cured. The resulting belt 42, which has a single layer of thread, is removed from the mandrel and the perforations 44 provided.

A second option is similar to the first, except that after a first layer of turn has been wound, winding continues in a reverse direction to provide a second layer of turns overlaying the first layer. Winding may continue further until there are three or four layers.

In further options, a continuous thread 58 could be wound around a long, e.g., 84" mandrel 70, until there are enough tightly wound turns to cover most of the mandrel 70, e.g., 80". Winding could be terminated at one layer of turns, or continued in alternating directions to build up two or more layers. The precursor formed after curing could then be cut into individual belts 42 that would be removed from the mandrel. The perforations 44 would be provided in the belts 42 as before.

The adhesive provides for maximum bonding of fabric layers or threads with each other. This imparts stiffness, which facilitates the handling of the belt material at later stages of the belt manufacturing process. Belts with multiple layers reach the maximum tensile strength of the material, since the layers are precluded from slipping past each other. Also, the adhesive helps to prevent individual threads from cutting into the rubber, and by providing stiffness in the belt, facilitates its handling.

In summary, the reinforcing belt 42 may be formed around a mandrel 70 to the desired width, or it may be cut from a longer precursor 68. It may be formed by winding a woven fabric 60 or ribbon 66, or by winding a continuous thread 58. It may be a single layer thick, or it could have a plurality of layers. A 2000 denier thread would normally be wound as a single layer, while a 1000 denier thread would normally be in two layers. In the case of ribbon 66 or fabric 60, the first layer must be at least partly and preferably completely overlapped by the second layer. The finished belt 42 has perforations 34 around its circumference, which are either provided after the belt 42 is formed, or prewoven in the case of the fabric 60 or ribbon 66. The perforations 34 provide a path for molten rubber to pass through the belt 42 during the molding process for the hanger, thereby enhancing the ultimate mechanical bond between the reinforcing belt 42 and the outer ring.

Modifications in the specific structure illustrated may be made without departing from the spirit and scope of the invention. It is also apparent that the exhaust system can be vertically disposed, as in some truck or bus installations, and that the hanger means may be used for installations and applications other than exhaust systems.

While there has been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

What is claimed:

1. A reinforced molded rubber hanger, comprising:
   (a) a rubber core having suspension points;
   (b) a rubber strip surrounding the core and contiguously attached thereto at a plurality of points; and
   (c) a band of fibrous reinforcement material embedded in the rubber strip, the band having at least one perforation through which rubber passes to provide a mechanical bond between the rubber and the band.

2. The molded rubber hanger of claim 1, where the fibrous reinforcement material comprises continuous fiber.

3. The molded rubber hanger of claim 1, where the fibrous reinforcement material comprises fabric.

4. A reinforced molded rubber hanger, comprising:
   (a) a rubber core;
   (b) a rubber strip surrounding the core and contiguously attached thereto at a plurality of points; and
   (c) a band of perforated fabric reinforcement material embedded in the rubber strip.

5. The hanger of claim 4, wherein rubber passes through the band of perforated fabric.

6. The hanger of claim 4, further comprising an adhesive compound coated on the fabric for holding together the reinforcement material.

7. The hanger of claim 4, further comprising a reinforcement material derived from a continuously wound thread.

8. The hanger of claim 4, in which perforations are woven into the fabric.

9. The hanger of claim 4, in which perforations are formed after weaving.

10. The hanger of claim 4, wherein the band is cut from a wider precursor.

11. A flexible suspension for an assembly depending from a structure, comprising:
    a reinforced molded rubber hanger having a rubber core;
    a rubber strip surrounding the core, the strip being contiguously attached to the core at a plurality of points;
    a belt of fibrous reinforcement material embedded in the rubber strip and having at least first and second perforations through which rubber from the strip passes and mechanically bonds to the belt so that first and second holes in the core respectively accept
    a first pin sized to fit through the first perforation affixed to the structure; and
    a second pin sized to fit through the second perforation affixed to the assembly.

12. The suspension of claim 11, wherein the strip is disposed in a generally vertical plane, and the reinforcement material comprises a reinforcing thread in the plane of the band so as to support a portion of any weight exerted by the assembly on the band.

13. The suspension of claim 11, wherein the assembly is an exhaust system and the structure is a vehicle.

14. The suspension of claim 13, wherein the pins are aligned with the general direction of the exhaust system.

* * * * *

UNITED STATES PATENT AND TRADEMARK OFFICE
CERTIFICATE OF CORRECTION

PATENT NO. : 6,402,119 B1
DATED : June 11, 2002
INVENTOR(S) : Stanley R. Miska

It is certified that error appears in the above-identified patent and that said Letters Patent is hereby corrected as shown below:

<u>Title page,</u>
*Attorney, Agent or Firm,* should read -- Harter, Secrest & Emery LLP --

Signed and Sealed this

Twenty-third Day of July, 2002

Attest:

Attesting Officer

JAMES E. ROGAN
*Director of the United States Patent and Trademark Office*